(12) United States Patent
Kareff et al.

(10) Patent No.: US 9,464,530 B2
(45) Date of Patent: Oct. 11, 2016

(54) TURBINE BUCKET AND METHOD FOR BALANCING A TIP SHROUD OF A TURBINE BUCKET

(71) Applicant: General Electric Company, Schenectady, NY (US)

(72) Inventors: Spencer Aaron Kareff, Greenville, SC (US); Matthew Robert Piersall, Greenville, SC (US); Danielle Werner, Greenville, SC (US)

(73) Assignee: General Electric Company, Schenectady, NY (US)

( * ) Notice: Subject to any disclaimer, the term of this patent is extended or adjusted under 35 U.S.C. 154(b) by 374 days.

(21) Appl. No.: 14/185,161

(22) Filed: Feb. 20, 2014

(65) Prior Publication Data

US 2015/0233258 A1    Aug. 20, 2015

(51) Int. Cl.
*F01D 5/30*     (2006.01)
*F01D 5/20*     (2006.01)
*F01D 5/22*     (2006.01)

(52) U.S. Cl.
CPC . *F01D 5/30* (2013.01); *F01D 5/20* (2013.01); *F01D 5/225* (2013.01); *Y02T 50/671* (2013.01)

(58) Field of Classification Search
CPC .............. F01D 5/12; F01D 5/14; F01D 5/20; F01D 5/22; F01D 5/225
USPC ................................ 416/189, 190, 191, 192
See application file for complete search history.

(56) References Cited

U.S. PATENT DOCUMENTS

| | | | |
|---|---|---|---|
| 6,805,530 B1 | 10/2004 | Urban | |
| 6,962,484 B2 * | 11/2005 | Brandl | F01D 5/16 415/173.4 |
| 7,094,023 B2 | 8/2006 | Dube et al. | |
| 7,094,032 B2 * | 8/2006 | Seleski | F01D 5/225 415/173.6 |
| 7,273,353 B2 | 9/2007 | Dube et al. | |
| 7,887,295 B2 * | 2/2011 | Brittingham | F01D 5/141 416/189 |
| 8,192,166 B2 | 6/2012 | Beeck et al. | |
| 8,956,104 B2 * | 2/2015 | Lacy | F01D 5/225 415/115 |
| 2004/0170500 A1 | 9/2004 | Urban et al. | |
| 2005/0111983 A1 | 5/2005 | Goetzfried et al. | |
| 2005/0129519 A1 * | 6/2005 | Beddard | F01D 5/225 416/192 |
| 2008/0292466 A1 | 11/2008 | Tragesser et al. | |
| 2011/0243714 A1 * | 10/2011 | Saxer | F01D 5/20 415/173.1 |
| 2013/0101395 A1 | 4/2013 | Miller et al. | |

FOREIGN PATENT DOCUMENTS

| | | |
|---|---|---|
| EP | 0774048 B1 | 10/1999 |
| EP | 2586980 A2 | 1/2013 |
| WO | 9412772 A1 | 4/1994 |

* cited by examiner

*Primary Examiner* — Jason L Vaughan
(74) *Attorney, Agent, or Firm* — Sutherland Asbill & Brennan LLP (57) ABSTRACT

The present application and the resultant patent provide a turbine bucket for a gas turbine engine. The turbine bucket may include an airfoil, a tip shroud positioned radially outward from the airfoil, and a seal rail positioned radially outward from the tip shroud and extending in a generally tangential direction from a first end to a second end of the tip shroud. The seal rail may include a maximum axial thickness at a location positioned between the first end and the second end and offset from the airfoil in the generally tangential direction. The present application and the resultant patent further provide a gas turbine engine and a method for balancing a tip shroud of a turbine bucket of a gas turbine engine.

20 Claims, 5 Drawing Sheets

TURBINE BUCKET AND METHOD FOR BALANCING A TIP SHROUD OF A TURBINE BUCKET

TECHNICAL FIELD

The present application and the resultant patent relate generally to gas turbine engines and more particularly relate to a turbine bucket and a method for balancing a tip shroud of a turbine bucket of a gas turbine engine.

BACKGROUND OF THE INVENTION

In a gas turbine engine, hot combustion gases generally may flow from one or more combustors through a transition piece and along a hot gas path of a turbine. A number of turbine stages typically may be disposed in series along the hot gas path so that the combustion gases flow through first-stage nozzles and buckets and subsequently through nozzles and buckets of later stages of the turbine. In this manner, the nozzles may direct the combustion gases toward the respective buckets, causing the buckets to rotate and drive a load, such as an electrical generator and the like. The combustion gases may be contained by stationary circumferential shrouds surrounding the buckets, which also may aid in directing the combustion gases along the hot gas path.

Certain turbine buckets may include a tip shroud positioned radially outward from an airfoil thereof. During operation of the turbine, the tip shroud may prevent failure of the airfoil in high cycle fatigue due to vibratory stresses. However, stresses may be induced at a fillet region between the airfoil and the tip shroud due to centrifugal forces acting on the tip shroud. According to certain configurations, the turbine bucket also may include a seal rail positioned radially outward from the tip shroud and extending in a tangential direction with respect to a central axis of rotation of the turbine. The seal rail generally may extend radially into a groove formed in the corresponding stationary circumferential shroud. In this manner, the seal rail may control or prevent leakage of the combustion gases between the tip shroud and the stationary circumferential shroud. Further, the seal rail may reduce bending of the tip shroud, although the added mass of the seal rail may increase stresses at the fillet region.

According to one known configuration, the seal rail may extend in the tangential direction from a first end to a second end of the tip shroud, and the seal rail may have an axial thickness that is constant along the tangential direction. Although such configuration may control leakage over the tip shroud and may reduce bending of the tip shroud, the added mass of the seal rail, particularly at the ends of the tip shroud, may significantly increase stresses at the fillet region. Increased stresses at high operating temperatures may lead to a high creep rate on the tip shroud, which may reduce part life of the turbine bucket. Additionally, the increased stresses at elevated temperatures may reduce fatigue life of the turbine bucket. Further, such a seal rail configuration may present challenges in achieving tip shroud balance and frequency tuning of the turbine bucket, which also may reduce part life of the turbine bucket.

There is thus a desire for a turbine bucket having an improved seal rail configuration for achieving tip shroud balance and frequency tuning of the turbine bucket. Specifically, such a seal rail configuration may be optimized to achieve proper tip shroud balance while also providing the necessary seal rail mass for supporting the tip shroud and maintaining desired frequency margins. In this manner, such a seal rail configuration may increase part life of the turbine bucket and thus may reduce the incidence of costly repairs and shutdown of the turbine.

SUMMARY OF THE INVENTION

The present application and the resultant patent thus provide a turbine bucket for a gas turbine engine. The turbine bucket may include an airfoil, a tip shroud positioned radially outward from the airfoil, and a seal rail positioned radially outward from the tip shroud and extending in a generally tangential direction from a first end to a second end of the tip shroud. The seal rail may include a maximum axial thickness at a location positioned between the first end and the second end and offset from the airfoil in the generally tangential direction.

The present application and the resultant patent also provide a method for balancing a tip shroud of a turbine bucket of a gas turbine engine. The method may include the step of providing a seal rail positioned radially outward from the tip shroud and extending in a generally tangential direction from a first end to a second end of the tip shroud. The method also may include the step of varying an axial thickness of the seal rail such that a maximum axial thickness is positioned at a location between the first end and the second end and offset from an airfoil of the turbine bucket in the generally tangential direction.

The present application and the resultant patent further provide a gas turbine engine. The gas turbine engine may include a compressor, a combustor in communication with the compressor, and a turbine in communication with the combustor. The turbine may include a number of turbine buckets arranged in a circumferential array. Each of the turbine buckets may include an airfoil, a tip shroud positioned radially outward from the airfoil, and a seal rail positioned radially outward from the tip shroud and extending in a generally tangential direction from a first end to a second end of the tip shroud. The seal rail may include a maximum axial thickness at a location positioned between the first end and the second end and offset from the airfoil in the generally tangential direction.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
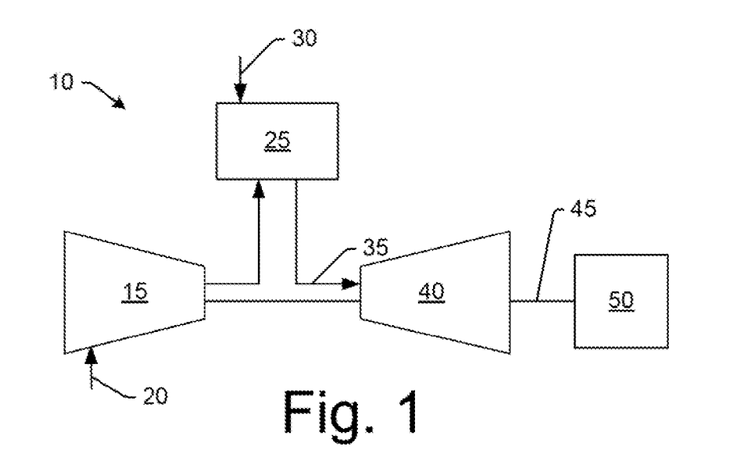
FIG. 1 is a schematic diagram of a gas turbine engine including a compressor, a combustor, and a turbine.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. Other configurations and other components may be used herein.

The gas turbine engine 10 may use natural gas, various types of syngas, and/or other types of fuels. The gas turbine engine 10 may be any one of a number of different gas turbine engines offered by General Electric Company of Schenectady, New York, including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together. Although the gas turbine engine 10 is shown herein, the present application may be applicable to any type of turbo machinery, such as a steam turbine engine.

Figure 2:
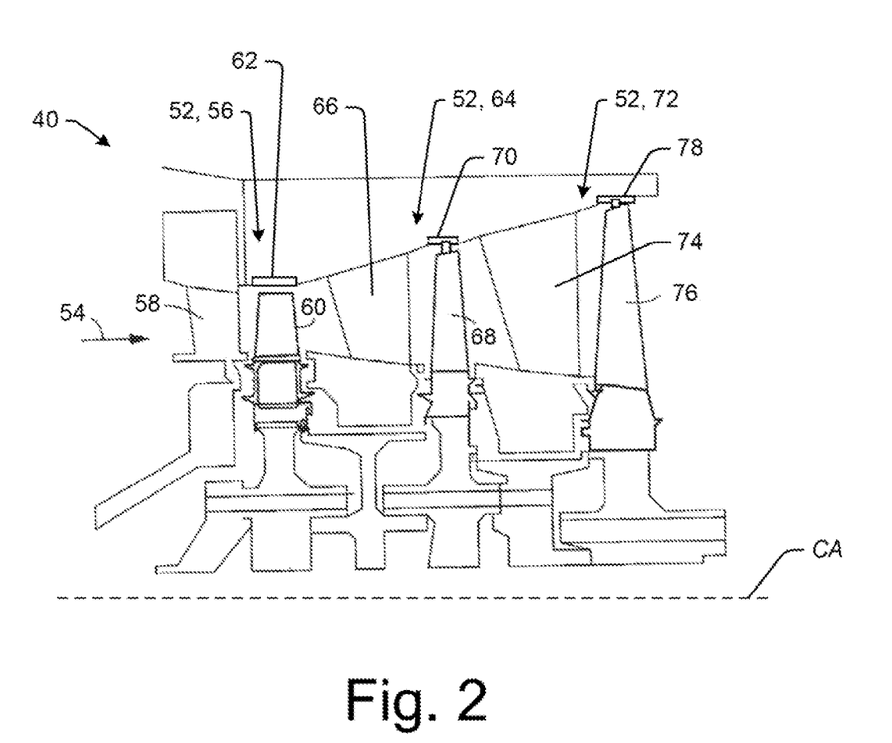
FIG. 2 is a schematic diagram of a portion of a turbine as may be used in the gas turbine engine of FIG. 1, showing a number of turbine stages.

FIG. 2 shows a schematic diagram of a portion of the turbine 40 including a number of stages 52 positioned in a hot gas path 54 of the gas turbine engine 10. A first stage 56 may include a number of circumferentially-spaced first-stage nozzles 58 and a number of circumferentially-spaced first-stage buckets 60 positioned about a central axis CA of the turbine 40. The first stage 56 also may include a first-stage shroud 62 extending circumferentially and surrounding the first-stage buckets 60. The first-stage shroud 62 may include a number of shroud segments positioned adjacent one another in an annular arrangement. In a similar manner, a second stage 64 may include a number of second-stage nozzles 66, a number of second-stage buckets 68, and a second-stage shroud 70 surrounding the second-stage buckets 68. Further, a third stage 72 may include a number of third-stage nozzles 74, a number of third-stage buckets 76, and a third-stage shroud 78 surrounding the third-stage buckets 76. Although the portion of the turbine 40 is shown as including three stages 52, the turbine 40 may include any number of stages 52 positioned along the central axis CA of the turbine 40.

Figure 3:
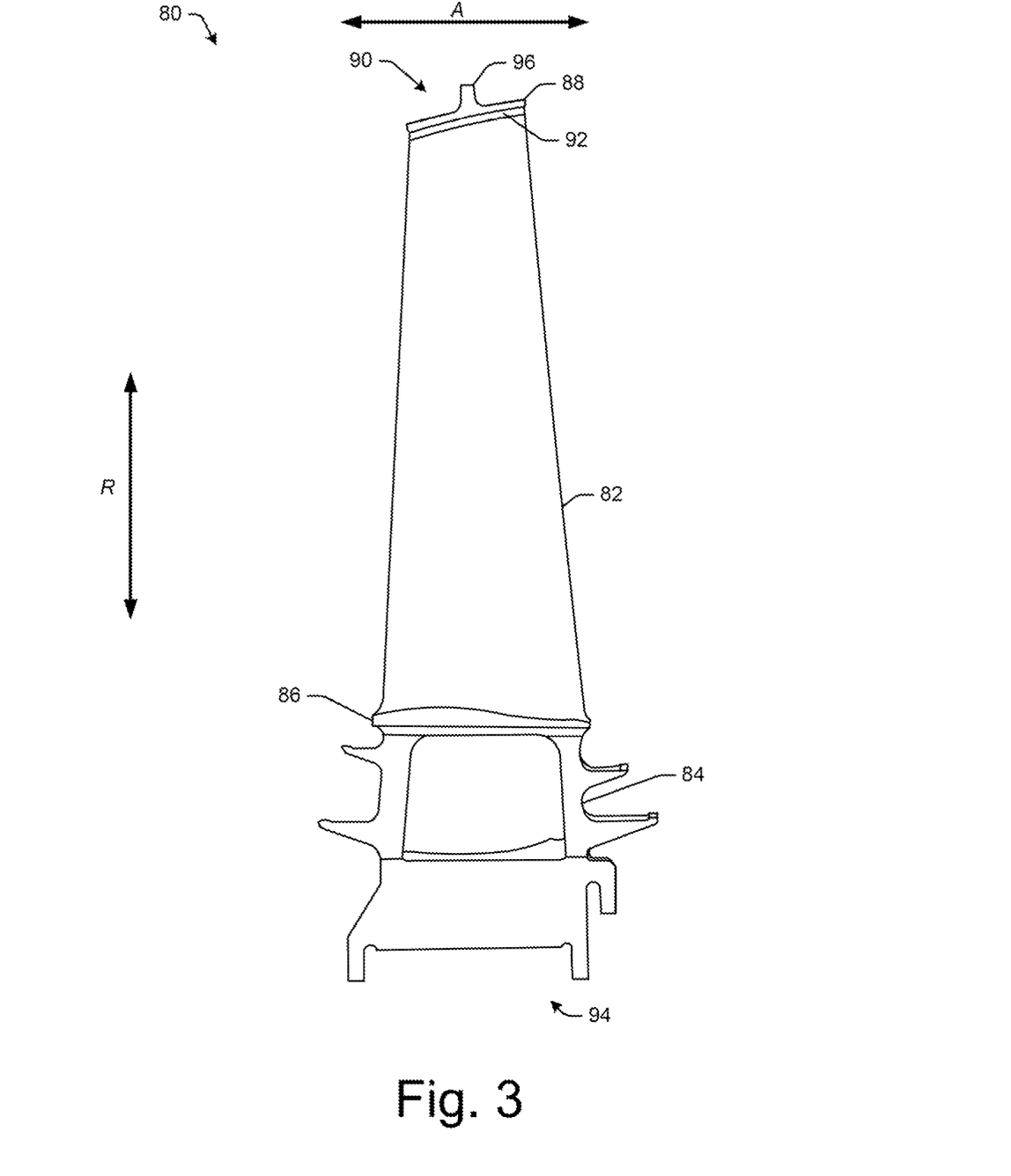
FIG. 3 is a front plan view of a known turbine bucket as may be used in the turbine of FIG. 2, the turbine bucket including an airfoil, a tip shroud, and a seal rail.
Figure 4:
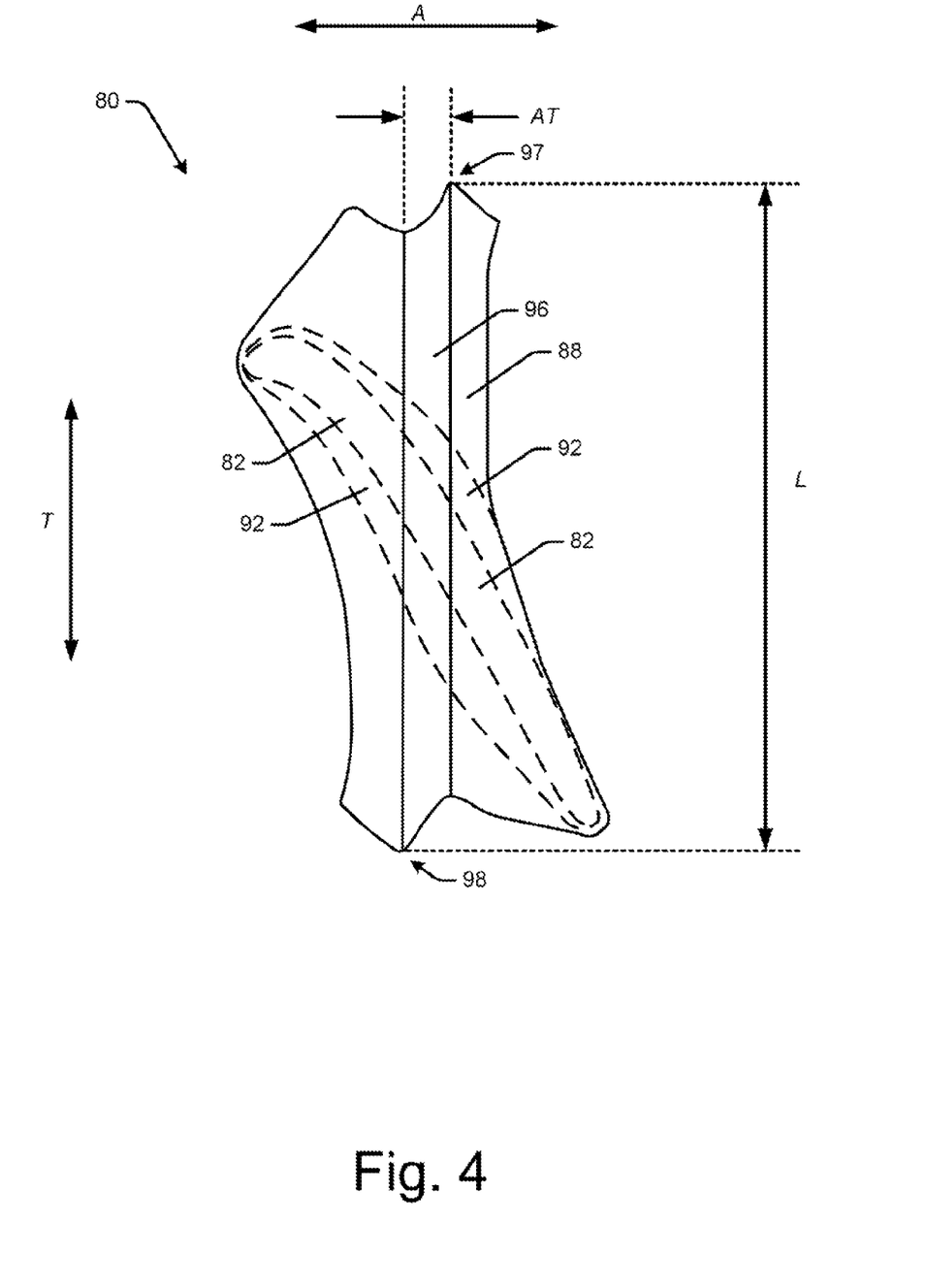
FIG. 4 is a top plan view of a portion of the turbine bucket of FIG. 3, showing the tip shroud, the seal rail, and the airfoil (illustrated by hidden lines).

FIGS. 3 and 4 show a known turbine bucket 80 as may be used in one of the stages 52 of the turbine 40. For example, the bucket 80 may be used in the second stage 64 or a later stage of the turbine 40. Generally described, the turbine bucket 80 may include an airfoil 82, a shank 84, and a platform 86 disposed between the airfoil 82 and the shank 84. As described above, a number of the buckets 80 may be arranged in a circumferential array within the stage 52 of the turbine 40. In this manner, the airfoil 82 of each bucket 80 may extend radially with respect to the central axis CA of the turbine 40, while the platform 86 of each bucket 80 extends tangentially with respect to the central axis CA of the turbine 40.

As is shown, the airfoil 82 may extend in a radial direction R outward from the platform 86 to a tip shroud 88 positioned about a tip end 90 of the bucket 80. In some embodiments, the tip shroud 88 may be connected to the airfoil 82 via a fillet region 92. The shank 84 may extend radially inward from the platform 86 to a root end 94 of the bucket 80, such that the platform 86 generally defines an interface between the airfoil 82 and the shank 84. As is shown, the platform 86 may be formed so as to extend generally parallel to the central axis CA of the turbine 40 during operation thereof. The shank 84 may be formed to define a root structure, such as a dovetail, configured to secure the bucket 80 to a turbine disk of the turbine 40. During operation of the turbine 40, the flow of combustion gases 35 travels along the hot gas path 54 and over the platforms 86 of the buckets 80, which along with an outer circumference of the turbine disk generally may form the radially inner boundary of the hot gas path 54. In a similar manner, the tip shrouds 88 of the buckets 80 generally may form the radially outer boundary of the hot gas path 54.

As is shown in FIGS. 3 and 4, the bucket 80 also may include a seal rail 96 positioned radially outward from the tip shroud 88. In some embodiments, the seal rail 96 may be integrally formed with the tip shroud 88. As is shown, the seal rail 96 may extend in a tangential direction T with respect to the central axis CA of the turbine 40. Specifically, the seal rail 96 may extend in the tangential direction T from a first end 97 of the tip shroud 88 to a second end 98 of the tip shroud 88. As is shown, the seal rail 96 may have an axial thickness AT, measured in an axial direction A, which is constant along a length L of the seal rail 96, measured in the tangential direction T. As described above, the seal rail 96 generally may extend radially into a groove formed in a corresponding stationary circumferential shroud. In this manner, the seal rail 96 may control or prevent leakage of the combustion gases between the tip shroud 88 and the stationary circumferential shroud during operation of the turbine 40. Further, the seal rail 96 may reduce bending of the tip shroud 88 during operation of the turbine 40, although the added mass of the seal rail 96 may increase stresses at the fillet region 92.

Figure 5:
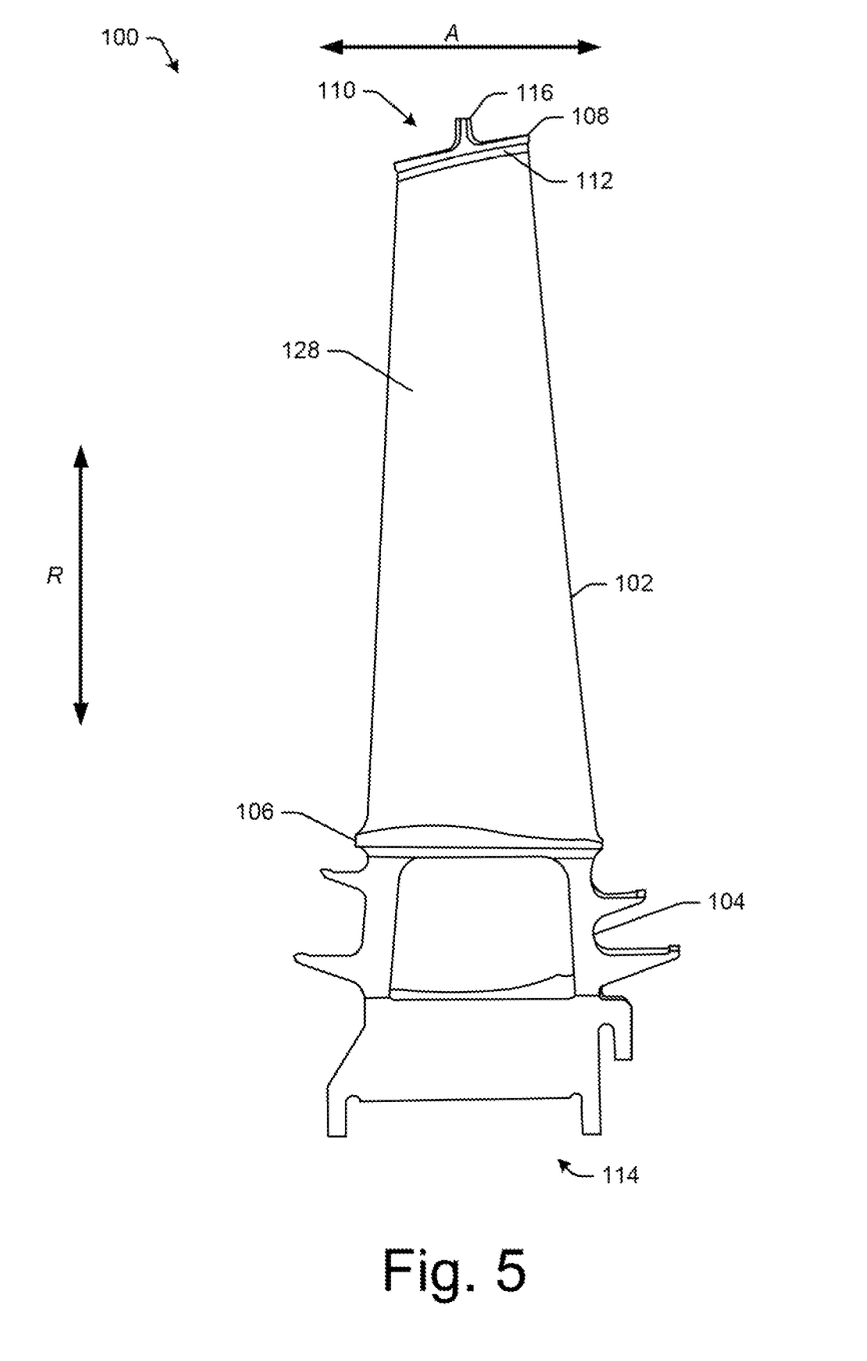
FIG. 5 is a front plan view of one embodiment of a turbine bucket as may be described herein and as may be used in the turbine of FIG. 2, the turbine bucket including an airfoil, a tip shroud, and a seal rail.
Figure 6:
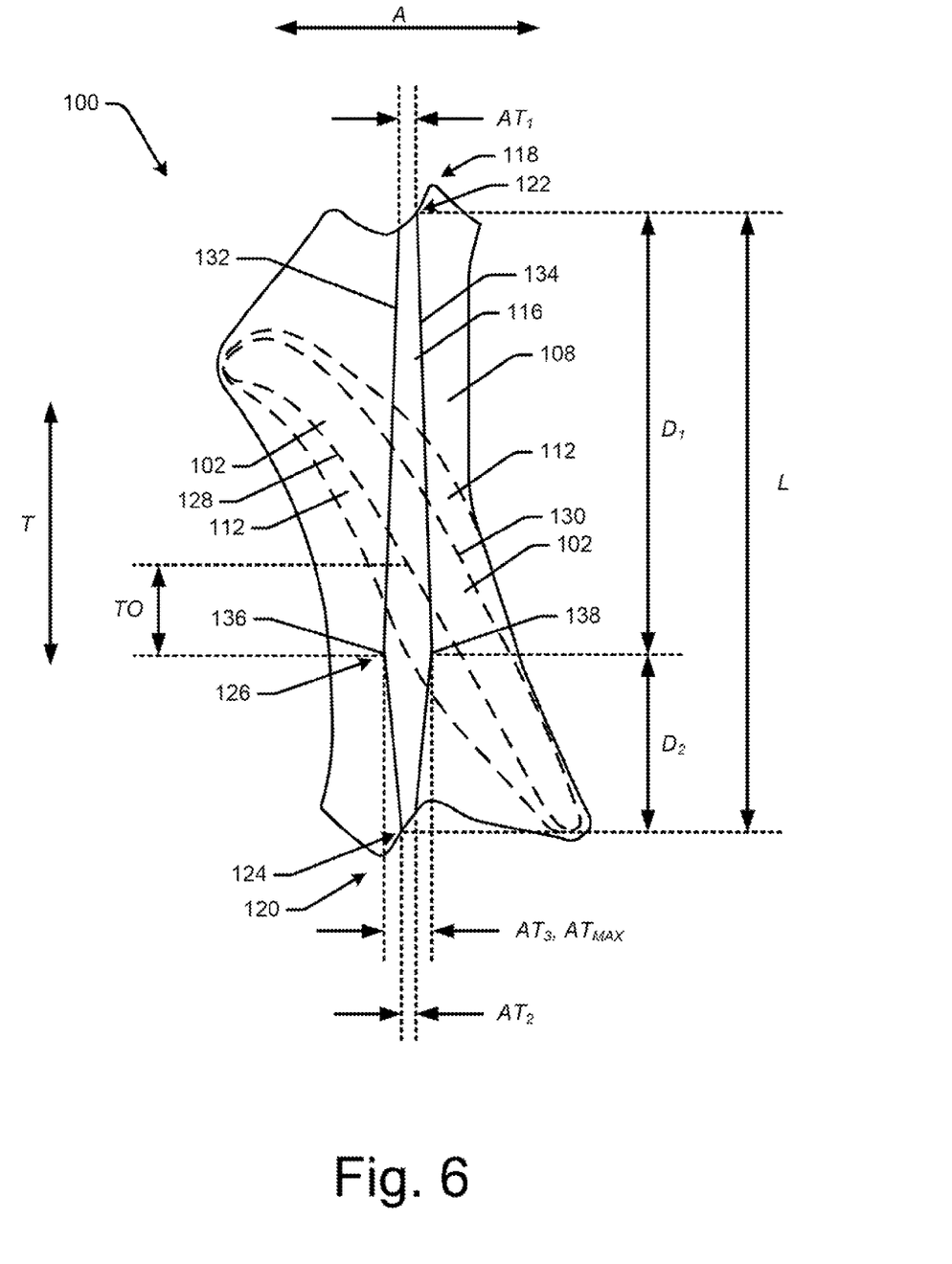
FIG. 6 is a top plan view of a portion of the turbine bucket of FIG. 5, showing the tip shroud, the seal rail, and the airfoil (illustrated by hidden lines).

FIGS. 5 and 6 show one embodiment of a turbine bucket 100 as may be described herein. The turbine bucket 100 may be used in one of the stages 52 of the turbine 40 and generally may be configured in a manner similar to the turbine bucket 80 described above, although certain differences in structure and function are described herein below. For example, the bucket 100 may be used in the second stage 64 or a later stage of the turbine 40. As is shown, the bucket 100 may include an airfoil 102, a shank 104, and a platform 106 disposed between the airfoil 102 and the shank 104. A number of the buckets 100 may be arranged in a circumferential array within the stage 52 of the turbine 40. In this manner, the airfoil 102 of each bucket 100 may extend radially with respect to the central axis CA of the turbine 40, while the platform 106 of each bucket 100 extends tangentially with respect to the central axis CA of the turbine 40.

As is shown, the airfoil 102 may extend in a radial direction R outward from the platform 106 to a tip shroud 108 positioned about a tip end 110 of the bucket 100. In some embodiments, the tip shroud 108 may be connected to the airfoil 102 via a fillet region 112. The shank 104 may extend radially inward from the platform 106 to a root end 114 of the bucket 100, such that the platform 106 generally defines an interface between the airfoil 102 and the shank 104. As is shown, the platform 106 may be formed so as to extend generally parallel to the central axis CA of the turbine 40 during operation thereof. The shank 104 may be formed to define a root structure, such as a dovetail, configured to secure the bucket 80 to a turbine disk of the turbine 40. During operation of the turbine 40, the flow of combustion gases 35 travels along the hot gas path 54 and over the platforms 106 of the buckets 100, which along with an outer circumference of the turbine disk form the radially inner boundary of the hot gas path 54. In a similar manner, the tip shrouds 108 of the buckets 100 generally may form the radially outer boundary of the hot gas path 54.

As is shown in FIGS. 5 and 6, the bucket 100 also may include a seal rail 116 positioned radially outward from the tip shroud 108. In some embodiments, the seal rail 116 may be integrally formed with the tip shroud 108. As is shown, the seal rail 116 may extend in a tangential direction T with respect to the central axis CA of the turbine 40. Specifically, the seal rail 116 may extend in the tangential direction T from a first end 118 of the tip shroud 108 to a second end 120 of the tip shroud 88. In this manner, the seal rail 116 may have a length L, measured in the tangential direction T, extending from a first end 122 of the seal rail 116 to a second end 124 of the seal rail 116. The first end 122 may be a leading end and the second end 124 may be a trailing end with respect to a direction of rotation of the seal rail 116 about the central axis CA of the turbine. As is shown, the seal rail 116 may have an axial thickness, measured in an axial direction A, which varies along the length L of the seal rail 116. The seal rail 116 may have a first axial thickness $AT_1$ at the first end 122 thereof and a second axial thickness $AT_2$ at the second end 124 thereof. In some embodiments, the first axial thickness $AT_1$ may be equal to the second axial thickness $AT_2$. In other embodiments, the first axial thickness $AT_1$ may be greater than the second axial thickness $AT_2$. In still other embodiments, the first axial thickness $AT_1$ may be less than the second axial thickness $AT_2$.

According to certain embodiments, the seal rail 116 may have a pre-twist configuration and thus may extend at a slight twist angle relative to the tangential direction T shown in FIG. 6. In other words, the seal rail 116 may extend in a generally tangential direction with respect to the central axis CA of the turbine 40 as a result of the twist angle.

As is shown in FIG. 6, the seal rail 116 may have a third axial thickness $AT_3$ at a location positioned between the first end 122 and the second end 124 of the seal rail 116, and the third axial thickness $AT_3$ may be greater than the first axial thickness $AT_1$ and the second axial thickness $AT_2$. Specifically, the third axial thickness $AT_3$ may constitute a maximum axial thickness $AT_{MAX}$ of the seal rail 116 at a maximum axial thickness location 126 positioned between the first end 122 and the second end 124. As is shown, the maximum axial thickness location 126 may be positioned a first distance $D_1$ from the first end 122 and a second distance $D_2$ from the second end 124, wherein the first distance $D_1$ is different from the second distance $D_2$. In other words, the maximum axial thickness location 126 may be offset from a midpoint of the length L of the seal rail 116. In some embodiments, the first distance $D_1$ may be greater than the second distance $D_2$. In other embodiments, the first distance $D_1$ may be less than the second distance $D_2$.

According to certain embodiments, as is shown in FIG. 6, the maximum axial thickness location 126 may be offset from the airfoil 102 (illustrated by hidden lines) in the tangential direction T. Specifically, the maximum axial thickness location 126 may have a tangential offset TO, measured in the tangential direction T, relative to the airfoil 102. In some embodiments, the maximum axial thickness location 126 may be offset about a pressure side 128 of the airfoil 102, as is shown. In other embodiments, the maximum axial thickness location 126 may be offset about a suction side 130 of the airfoil 102. In some embodiments, the maximum axial thickness location 126 may be radially aligned with a portion of the fillet region 112 (illustrated by hidden lines). In other embodiments, the maximum axial thickness location 126 may be offset from the fillet region 112 in the tangential direction T.

The axial thickness of the seal rail 116 may increase from the first end 122 to the maximum axial thickness location 126 and also may increase from the second end 124 to the maximum axial thickness location 126. In some embodiments, the axial thickness of the seal rail 116 may constantly increase from the first end 122 to the maximum axial thickness location 126 and also may constantly increase from the second end 124 to the maximum axial thickness location 126, as is shown. In other embodiments, the seal rail 116 may include one or more regions of constant axial thickness positioned between the first end 122 and the maximum axial thickness location 126 and/or between the second end 124 and the maximum axial thickness location 126. In still other embodiments, the axial thickness of the seal rail 116 may variably increase from the first end 122 to the maximum axial thickness location 126 and also may variably increase from the second end 124 to the maximum axial thickness location 126, as is shown.

The seal rail 116 may include an upstream face 132 and a downstream face 134 each extending from the first end 122 to the second end 124. According to certain embodiments, the maximum axial thickness location 126 may be defined by a first radially-extending edge 136 of the upstream face 132 and a second radially-extending edge 138 of the downstream face 134. In some embodiments, the first radially-extending edge 136 and the second radially-extending edge 138 may be aligned with one another in the tangential direction T, as is shown. According to certain embodiments, the maximum axial thickness location 126 may be defined by a first planar surface of the upstream face 132 and a second planar surface of the downstream face 134. In some embodiments, the first planar surface and the second planar surface may be aligned with one another in the tangential direction T.

The specific dimensions of the seal rail 116, including the length L, the first axial thickness $AT_1$, the second axial thickness $AT_2$, the maximum axial thickness $AT_{MAX}$, the first distance $D_1$, the second distance $D_2$, and the tangential offset TO, may be selected to optimally achieve proper balance of the tip shroud 108 while also providing necessary mass for supporting the tip shroud 108 and maintaining desired frequency margins. Due to the varying axial thickness along the length L of the seal rail 116, the mass of the seal rail 116 near the first and second ends 122, 124 may be selected to provide only the amount necessary to support the tip shroud 108 and reduce bending thereabout, without unnecessarily increasing stresses at the fillet region 112. Meanwhile, the maximum axial thickness $AT_{MAX}$ and the maximum axial thickness location 126, as determined by the first distance $D_1$, the second distance $D_2$, and the tangential offset TO, may be selected to achieve tip shroud balance and provide the necessary mass for frequency tuning of the bucket 100. Accordingly, the configuration of the seal rail 116 may provide improved optimization of tip shroud balance and frequency tuning, as compared to the seal rail 96 having a constant axial thickness.

The embodiments described herein thus provide a turbine bucket having an improved seal rail configuration for achieving tip shroud balance and frequency tuning of the turbine bucket. As described above, the seal rail configuration may be optimized to achieve proper tip shroud balance while also providing the necessary seal rail mass for supporting the tip shroud and maintaining desired frequency margins. In this manner, the seal rail configuration ultimately may increase part life of the turbine bucket and thus may reduce the incidence of costly repairs and shutdown of the turbine.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A turbine bucket for a gas turbine engine, the turbine bucket comprising:
   an airfoil;
   a tip shroud positioned radially outward from the airfoil; and
   a seal rail positioned radially outward from the tip shroud and extending in a generally tangential direction from a first end to a second end of the tip shroud, wherein the seal rail comprises a maximum axial thickness at a location positioned between the first end and the second end of the tip shroud and entirely offset from a pressure side or a suction side of the airfoil in the generally tangential direction.

2. The turbine bucket of claim 1, wherein the seal rail comprises a first end and a second end, wherein the maximum axial thickness location is positioned a first distance from the first end of the seal rail and a second distance from the second end of the seal rail, and wherein the first distance is different from the second distance.

3. The turbine bucket of claim 2, wherein the seal rail comprises a first axial thickness at the first end of the seal rail and a second axial thickness at the second end of the seal rail, and wherein the first axial thickness is equal to the second axial thickness.

4. The turbine bucket of claim 2, wherein the seal rail comprises a first axial thickness at the first end of the seal rail and a second axial thickness at the second end of the seal rail, and wherein the first axial thickness is different from the second axial thickness.

5. The turbine bucket of claim 2, wherein the axial thickness of the seal rail constantly increases from the first end of the seal rail to the maximum axial thickness location, and wherein the axial thickness of the seal rail constantly increases from the second end of the seal rail to the maximum axial thickness location.

6. The turbine bucket of claim 2, wherein the seal rail comprises one or more regions of constant axial thickness positioned between the maximum axial thickness location and one of the first end of the seal rail and the second end of the seal rail.

7. The turbine bucket of claim 1, wherein the first end of the tip shroud is a leading end of the tip shroud, wherein the second end of the tip shroud is a trailing end of the tip shroud, and wherein the maximum axial thickness location is positioned between the second end of the tip shroud and the airfoil and entirely offset from the pressure side of the airfoil in the generally tangential direction.

8. The turbine bucket of claim 1, wherein the first end of the tip shroud is a leading end of the tip shroud, wherein the second end of the tip shroud is a trailing end of the tip shroud, and wherein the maximum axial thickness location is positioned between the first end of the tip shroud and the airfoil and entirely offset from the suction side of the airfoil in the generally tangential direction.

9. The turbine bucket of claim 1, wherein the tip shroud is connected to the airfoil via a fillet region, and wherein the maximum axial thickness location is entirely offset from the fillet region in the generally tangential direction.

10. The turbine bucket of claim 1, wherein the tip shroud is connected to the airfoil via a fillet region, and wherein the maximum axial thickness location is radially aligned with a portion of the fillet region.

11. The turbine bucket of claim 1, wherein the seal rail comprises an upstream face and a downstream face, wherein the maximum axial thickness location is defined by a first radially-extending edge of the upstream face and a second radially-extending edge of the downstream face, and wherein the first radially-extending edge and the second radially-extending edge are aligned with one another in the generally tangential direction.

12. A method for balancing a tip shroud of a turbine bucket of a gas turbine engine, the method comprising:
   providing a seal rail positioned radially outward from the tip shroud and extending in a generally tangential direction from a first end to a second end of the tip shroud;
   varying an axial thickness of the seal rail such that a maximum axial thickness is positioned at a location between the first end and the second end of the tip shroud and entirely offset from a pressure side or a suction side of an airfoil of the turbine bucket in the generally tangential direction.

13. The method of claim 12, wherein varying the axial thickness of the seal rail comprises balancing the tip shroud about the airfoil.

14. The method of claim 12, wherein varying the axial thickness of the seal rail comprises distributing the mass of the seal rail to obtain desired frequency margins.

15. A gas turbine engine, comprising:
   a compressor;
   a combustor in communication with the compressor; and
   a turbine in communication with the combustor, the turbine comprising a plurality of turbine buckets arranged in a circumferential array, each of the turbine buckets comprising:
   an airfoil;
   a tip shroud positioned radially outward from the airfoil; and
   a seal rail positioned radially outward from the tip shroud and extending in a generally tangential direction from a first end to a second end of the tip shroud, wherein the seal rail comprises a maximum axial thickness at a location positioned between the first end and the second end of the tip shroud and entirely offset from a pressure side or a suction side of the airfoil in the generally tangential direction.

16. The gas turbine engine of claim 15, wherein the seal rail comprises a first end and a second end, wherein the maximum axial thickness location is positioned a first distance from the first end of the seal rail and a second distance from the second end of the seal rail, and wherein the first distance is different from the second distance.

17. The gas turbine engine of claim 16, wherein the axial thickness of the seal rail constantly increases from the first end of the seal rail to the maximum axial thickness location, and wherein the axial thickness of the seal rail constantly increases from the second end of the seal rail to the maximum axial thickness location.

18. The gas turbine engine of claim 15, wherein the first end of the tip shroud is a leading end of the tip shroud, wherein the second end of the tip shroud is a trailing end of the tip shroud, and wherein the maximum axial thickness location is positioned between the second end of the tip shroud and the airfoil and entirely offset from the pressure side of the airfoil in the generally tangential direction.

19. The gas turbine engine of claim 15, wherein the first end of the tip shroud is a leading end of the tip shroud, wherein the second end of the tip shroud is a trailing end of the tip shroud, and wherein the maximum axial thickness location is positioned between the first end of the tip shroud and the airfoil and entirely offset from the suction side of the airfoil in the generally tangential direction.

20. The gas turbine engine of claim 15, wherein the seal rail comprises an upstream face and a downstream face, wherein the maximum axial thickness location is defined by a first radially-extending edge of the upstream face and a second radially-extending edge of the downstream face, and wherein the first radially-extending edge and the second radially-extending edge are aligned with one another in the generally tangential direction.

* * * * *